United States Patent [19]

Morlion et al.

[11] Patent Number: 5,608,836
[45] Date of Patent: Mar. 4, 1997

[54] METHOD FOR MANUFACTURING A CONNECTOR FOR OPTICAL CONDUCTORS ON A PRINTED CIRCUIT BOARD AS WELL AS PROTECTION COVER AND ALIGNMENT PIECE TO BE USED IN THIS METHOD

[75] Inventors: Danny Morlion, St. Amandsberg; Jan P. K. Van Koetsem, Zwijndrecht; Luc Jonckheere, Dilbeek, all of Belgium

[73] Assignee: Framatome Connectors International, Courbevoie, France

[21] Appl. No.: 601,188

[22] Filed: Feb. 14, 1996

[30] Foreign Application Priority Data

Feb. 21, 1995 [NL]  Netherlands ........................... 9500328

[51] Int. Cl.$^6$ ..................................................... G02B 6/36
[52] U.S. Cl. ........................... 385/137; 385/83; 385/147; 385/89
[58] Field of Search ................. 29/832, 846; 385/88–94, 385/831, 137, 134, 147

[56] References Cited

U.S. PATENT DOCUMENTS

| 5,359,686 | 10/1994 | Galloway et al. | 385/89 |
| 5,367,593 | 11/1994 | Lebby et al. | 385/89 |
| 5,436,997 | 7/1995 | Makiuchi et al. | 385/89 |
| 5,539,848 | 7/1996 | Galloway | 385/89 |

FOREIGN PATENT DOCUMENTS

| 0264108A2 | 4/1988 | European Pat. Off. . |
| 0602726A1 | 6/1994 | European Pat. Off. . |
| 9310128 | 11/1993 | Germany . |

*Primary Examiner*—John Ngo
*Attorney, Agent, or Firm*—Perman & Green

[57] ABSTRACT

For manufacturing a connector for optical conductors on a printed circuit board a first printed circuit board part is made and an alignment piece with one or more reference faces and with one or more alignment channels for the conductors is fixed on the first printed circuit board part. The optical conductors are put in the alignment channels and are attached in the alignment piece, whereafter the parts of the optical conductors projecting out of the alignment piece and superfluous attachment material are removed by polishing and optical contact pads are formed in the upper surface of the alignment piece. A protection cover is put on the alignment piece, which protection cover seals the reference faces and the optical contact pads from the environment, whereafter the printed circuit board is completed and finally the protection cover is removed. The protection cover comprises an upper wall adapted to cover at least the surface of the alignment piece, and edges projecting downwardly from the upper wall and determining together with the upper wall a receiving space for at least a part of the alignment piece, which edges join the sides of the alignment piece when the protection cover is placed on the alignment piece.

4 Claims, 5 Drawing Sheets

METHOD FOR MANUFACTURING A CONNECTOR FOR OPTICAL CONDUCTORS ON A PRINTED CIRCUIT BOARD AS WELL AS PROTECTION COVER AND ALIGNMENT PIECE TO BE USED IN THIS METHOD

BACKGROUND OF THE INVENTION

The invention relates to a method for manufacturing a connector for optical conductors on a printed circuit board as well as a protection cover and an alignment piece, in particular to be used in this method.

Such a method is described in the earlier international application PCT/EP95/02403 of the same applicant. In this method the printed circuit board is completed after positioning the alignment piece on a first printed circuit board part and applying the optical conductors. Then the parts of the optical conductors projecting out of the printed circuit board and superfluous material at the location of the alignment piece are removed by polishing, wherein the optical contact pads are also made. Removing the projecting parts of the optical conductors by polishing in order to make the optical contact pads is a manufacturing step which has to be made carefully as the conductors can be damaged thereby. Because the complete printed circuit board is manufactured first, before the polishing step is carried out, it is not possible anymore to remove damaged conductor(s) if one or more optical conductors are possibly damaged, so that in case of such a possible damage the complete printed circuit board has become useless.

It is a first object of the invention to provide a method of the above-mentioned type wherein this disadvantage is overcome in an effective manner.

It is a further object of the invention to provide a protection cover to be used in this method.

A further object of the invention is to provide an alignment piece to be used with this protection cover in this method.

SUMMARY OF THE INVENTION

To this end the invention provides a method for manufacturing a connector for optical conductors on a printed circuit board, wherein a first printed circuit board part is made and an alignment piece with one or more reference faces and with one or more alignment channels for the conductors is fixed on the first printed circuit board part, wherein the optical conductors are put in the alignment channels and are attached in the alignment piece, whereafter the parts of the optical conductors projecting out of the alignment piece and superfluous attachment material are removed by polishing and optical contact pads are formed in the upper surface of the alignment piece, wherein a protection cover is put on the alignment piece, said protection cover sealing the reference faces and the optical contact pads from the environment, whereafter the printed circuit board is completed and finally the protection cover is removed.

As in the method of the invention the optical conductors are first fixed in the alignment piece and the polishing step is carried out, it is possible to replace the damaged conductor(s) if one or more optical conductors are possibly damaged. Moreover the polishing operation has only to be carried out on the surface of the alignment piece, so that the polishing step is relatively simple.

The invention further provides a protection cover for an alignment piece for optical conductors, in particular for application in the method of the invention. This protection cover comprises an upper wall adapted to cover at least the surface of the alignment piece, and edges projecting downwardly from the upper wall and determining together with the upper wall a receiving space for at least a part of the alignment piece, said edges joining the sides of the alignment piece when the protection cover is placed on the alignment piece.

Further the invention provides an alignment piece for optical conductors, in particular for application in the method of the invention. This alignment piece comprises a lower part and an upper part, said lower part projecting outwardly with respect to the upper part at at least two opposite sides in such a manner that upper and lower parts determine rebates for receiving corresponding edges of the protection cover.

BRIEF DESCRIPTION OF THE DRAWINGS

The invention will be further explained by reference to the drawings in which an embodiment of the method of the invention is schematically shown.

DETAILED DESCRIPTION OF THE PREFERRED EMBODIMENTS

Figure 1:
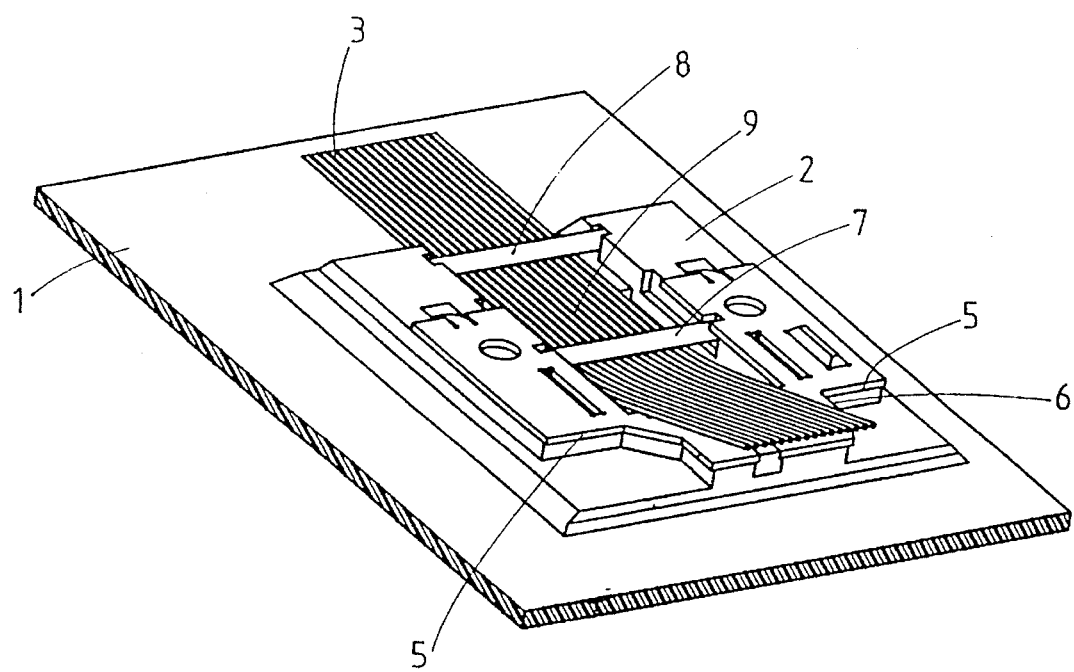
FIG. 1 shows a perspective view of a first printed circuit board part, on which an alignment piece is attached and wherein the optical conductors are applied in the alignment piece.

Referring to FIG. 1 there is shown a perspective view of a first printed circuit board part 1, an alignment piece 2 being attached to the same, wherein optical conductors 3 are applied in alignment channels of the alignment piece 2, which alignment channels cannot be seen in FIG. 1.

The alignment piece 2 is further described in a patent application of the same date of the same applicant. The alignment piece 2 further comprises reference faces 5 and 6 adapted to cooperate with reference projections of an alignment piece not shown and further described for example in the earlier international patent application PCT/EP95/02403 of the same applicant. The optical conductors 3 are guided in the alignment piece 2 under the correct angle of 14° in this case out of the alignment piece by means of two positioning elements 7, 8, as further described in the above-mentioned patent application of the same date.

Figure 2:
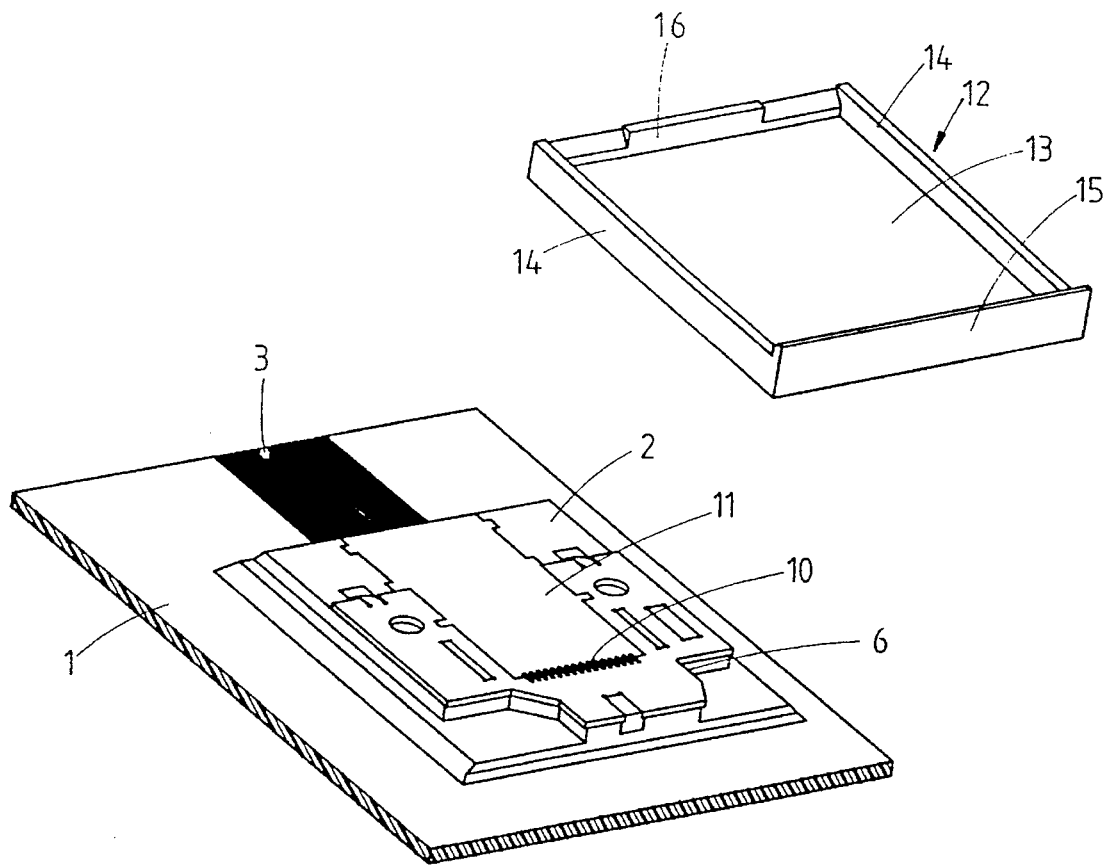
FIG. 2 shows a perspective view of the printed circuit board with alignment piece of FIG. 1, wherein the optical conductors are fixed and the polishing step is completed and wherein the protection cover is shown separated from the alignment piece and with its lower side up.
Figure 3:
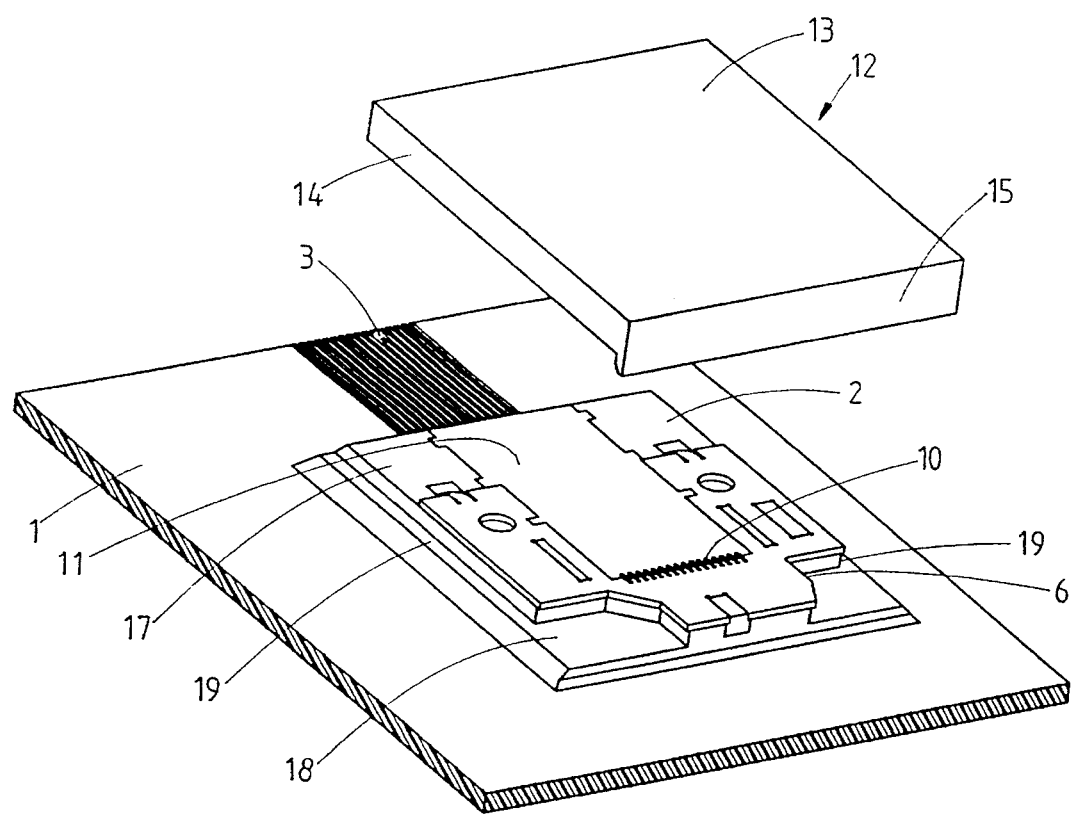
FIG. 3 shows a perspective view corresponding with FIG. 2, wherein the protection cover is shown separated from the alignment piece.

When the conductors 3 have been applied in the alignment piece 2 and have been fixed on the printed circuit board part 1, the conductors are attached in the alignment piece by filling the space 9 with epoxy resin for example, whereafter the parts of the conductors 3 projecting above the surface of the alignment piece 2 and superfluous filling material are removed by polishing. After completion of the polishing the situation of FIG. 2 is obtained, wherein optical contact pads 10 of the conductors 3 are formed in the surface of the alignment piece 2. Then a protection cover 12 which is shown in FIG. 2 with its lower side up, is disposed on the alignment piece 2 in the position of the protection cover 12 shown in FIG. 3. This protection cover 12 comprises an upper wall 13 adapted to cover the complete surface of the alignment piece 2. Along the circumference of the upper wall 13 downwardly directed side edges 14, a front edge 15 and a back edge 16 are provided. The upper wall 13 and the edges b 14–16 determine a space for receiving an upper part 17 of the alignment piece 2. This upper part 17 joins a lower part 18 projecting outwardly with respect to the upper part 17 at at least two opposite sides, so that rebates 19 are formed at the longitudinal sides in which the side edges 14 of the protection cover 12 are received. The lower part 18 has side edges extending obliquely outwardly to obtain a good anchorage of the alignment piece 2 in the printed circuit board.

Figure 4:
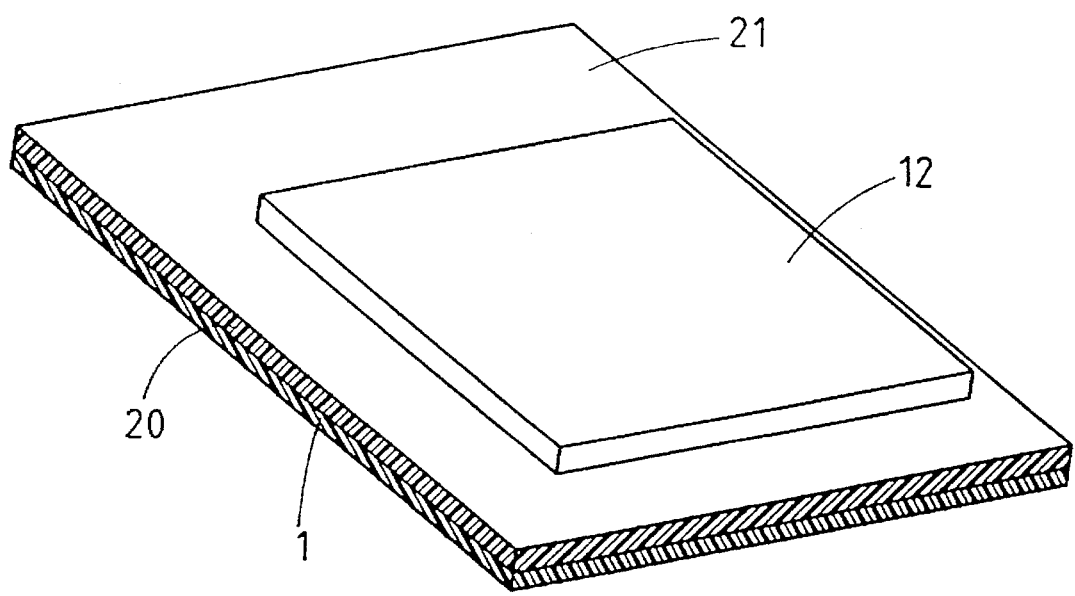
FIG. 4 shows a perspective view of a part of the printed circuit board after completion of the same, wherein the protection cover is still present.
Figure 5:
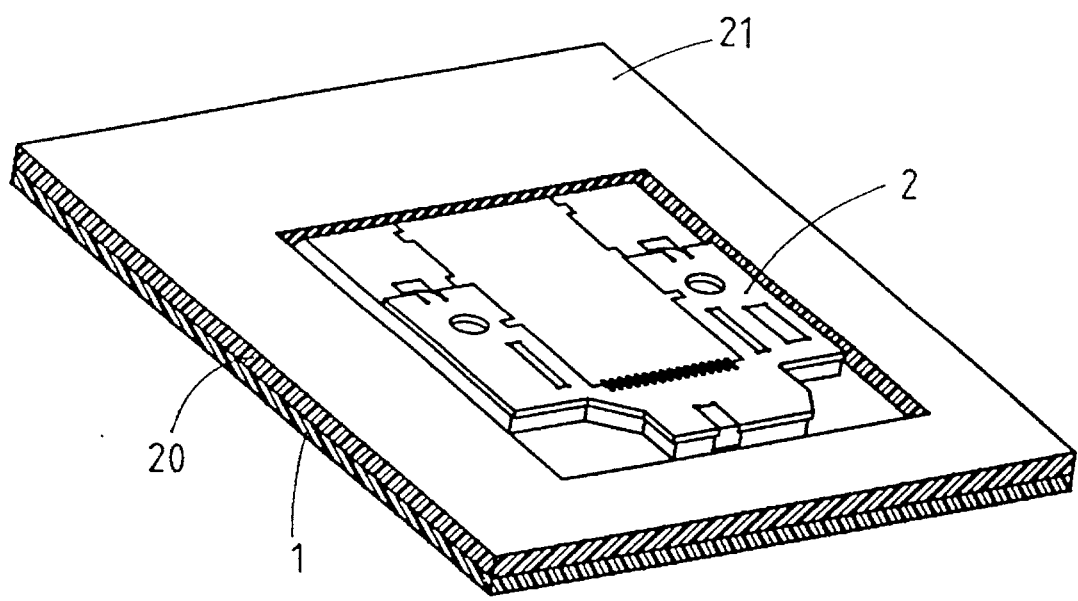
FIG. 5 shows a perspective view of the part of the printed circuit board of FIG. 4 after removing the protection cover.

When the protection cover 12 is disposed on the alignment piece 2, the reference faces 5, 6 and the contact pads 10 of the conductors 3 are sealed from the environment, whereafter a next layer 20 can be provided on the printed circuit board part 1 so that the printed circuit board 21 partially shown in FIG. 4 is obtained. The reference faces 5, 6 and the contact pads 10 are protected by the protection cover 12 during completing the printed circuit board 21 and therefore cannot be contaminated by material of the layer 20. Finally the protection cover 12 is removed so that the alignment piece 2 is accessible as shown in FIG. 5. In order to complete the connector a housing not shown is mounted on the printed circuit board 21.

The described method for manufacturing a connector for optical conductors on a printed circuit board shows the advantage that the polishing step for making the contact pads 10 is carried out before completing the printed circuit board. If, for example a conductor 3 is damaged, this conductor can be replaced if desired and it is not necessary to reject the complete printed circuit board. Moreover it is only necessary to polish a small surface, i.e. the surface of the alignment piece 2.

The invention is not restricted to the above-described embodiment which can be varied in a number of ways within the scope of the claims.

What is claimed is:

1. Method for manufacturing a connector for optical conductors on a printed circuit board, wherein a first printed circuit board part is made and an alignment piece with one or more reference faces and with one or more alignment channels for the conductors is fixed on the first printed circuit board part, wherein the optical conductors are put in the alignment channels and are attached in the alignment piece, whereafter the parts of the optical conductors projecting out of the alignment piece and superfluous attachment material are removed by polishing and optical contact pads are formed in the upper surface of the alignment piece, wherein a protection cover is put on the alignment piece, said protection cover sealing the reference faces and the optical contact pads from the environment, whereafter the printed circuit board is completed and finally the protection cover is removed.

2. Protection cover for an alignment piece for optical conductors, in particular for application in the method of claim 1, comprising an upper wall adapted to cover at least the surface of the alignment piece, and edges projecting downwardly from the upper wall and determining together with the upper wall a receiving space for at least a part of the alignment piece, said edges joining the sides of the alignment piece when the protection cover is placed on the alignment piece.

3. Alignment piece for optical conductors, in particular for application in the method of claim 1, comprising a lower part and an upper part, said lower part projecting outwardly with respect to the upper part at at least two opposite sides in such a manner that upper and lower parts determine rebates for receiving corresponding edges of the protection cover.

4. Alignment piece according to claim 3, wherein the lower part has side edges extending obliquely outwardly.

\* \* \* \* \*